May 25, 1965 J. CREMER ETAL 3,185,638
APPARATUS FOR CHEMICAL REACTIONS
Filed Jan. 16, 1961 3 Sheets-Sheet 1

INVENTORS
Joseph Cremer
Franz Rodis
BY Connolly and Hutz
THEIR ATTORNEYS

INVENTORS
Joseph Cremer
Franz Rodis

Connolly and Hutz
THEIR ATTORNEYS

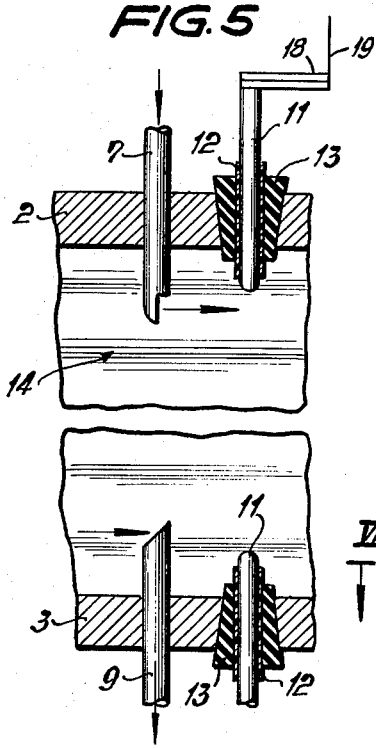
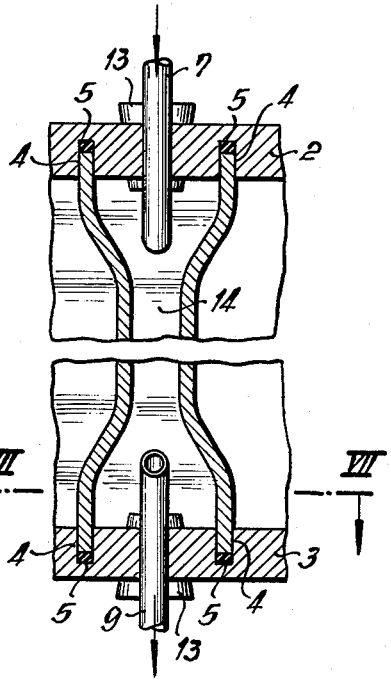
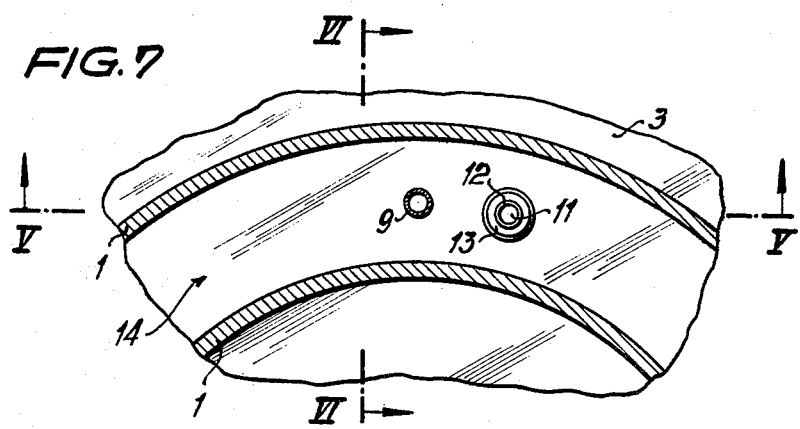

United States Patent Office 3,185,638
Patented May 25, 1965

3,185,638
APPARATUS FOR CHEMICAL REACTIONS
Joseph Cremer, Hermulheim, near Cologne, and Franz Rodis, Knapsack, near Cologne, Germany, assignors to Knapsack - Griesheim Aktiengesellschaft, Knapsack, near Cologne, Germany, a corporation of Germany
Filed Jan. 16, 1961, Ser. No. 82,857
Claims priority, application Germany, Jan. 29, 1960, K 39,759
17 Claims. (Cl. 204—312)

The present invention provides an apparatus for continuously carrying out chemical reactions of or between flowing vaporous and/or gaseous substances in the glow discharge under reduced pressure.

Various apparatus for carrying out reactions of the aforesaid kind are known. They differ from one another in the type of current used, the frequencies, the gas pressure, the direction of the gas current relatively to the direction of the electrical discharge, and creation of an inhomogeneous repartition of pressure, the displacement of discharge into the zone of pressure drop and in some cases also by the use of catalysts. However, as far as it is known, none of the known apparatus can be used for carrying out chemical reactions on an industrial scale.

When chemical reactions are carried out in electrical discharges there may be applied—according to the conditions that are most favorable for the reaction desired— either high concentrations of energy per unit of volume as is the case, for example, in arc discharges or low concentrations of energy per unit of volume of the reaction chamber constituting the discharge space, as is the case in glow discharges. If it is desired to enlarge such a device this may be done, in the case of arc discharge, by increasing the electrical power supplied and modifying the device accordingly. In the case of glow discharge, however, it is not possible simply to increase the electrical power input and to enlarge the apparatus if the low energy concentration per unit of volume shall remain constant. The possibility of a parallel connection of smaller devices constructed for reasons of experiment need not be considered here.

The reason for these facts is that within the range of low gas pressure and low current densities the positive column or the plasma of the glow discharge completely fills up the cross-sectional area of the discharge spaces whereas under higher pressures and increasing current densities, in particular when the cross-sectional areas of the discharge spaces are increased, the plasma detaches from the wall of the discharge space and shrinks up with the simultaneous increase of light intensity until finally the positive column resembles a so-called filament discharge. The last-mentioned form of discharge, however has a high concentration of energy per unit of volume and the conditions under which it takes place are consequently more or less similar to those of an arc discharge. These phenomena can be observed both when a continuous and when an alternating current is used and both when the gases are quiescent and when they are flowing. These phenomena are particularly impartant because a number of chemical substances which in the usual processes are formed in the glow discharge from vapors and/or gases introduced as starting materials are afterwards destroyed by the action of heat, so that only a small yield of the desired reaction or splitting products is obtained. In other cases an additional supply of heat to the reaction chamber is necessary.

The object of the present invention is an apparatus for continuously carrying out chemical reactions in the glow electrical discharge in flowing vapors and/or gases under low pressures, particular regard being given to the increase of the yield per unit of volume and time.

The apparatus embodying the invention consists of a plurality of coaxial hollow cylinders, which are placed one within the other and which are electrically insulated one from the other one to form annular chambers. Every other of the annular chambers serves as electrical discharge space while into the remaining annular chambers the cooling or heating medium is to be introduced. The total system of the coaxial hollow cylinders is closed at both ends, so as to be tight to gases and liquids, by means of end walls common to all the individual cylinders. One of said end walls serves at the same time as a support for the electrodes and the nozzles through which the reaction mixture or the starting material is introduced and the other wall serves as a support for the electrodes and the nozzles through which the reaction or splitting product issues and, in addition, the end walls support the armatures for the inlet and outlet fittings, respectively, of the cooling or heating medium. The cylinders are held together by means of tractor screws reaching from one wall to the other.

The hollow cylinders are made of metal and their surfaces limiting the discharge chambers are provided with an insulating coating of enamel or synthetic material which is electrically free from pores.

In another form of apparatus the hollow cylinders are made of an insulating material such as glass or ceramics and they are inserted in the end walls, which in the case may be of metal, in such a manner that the device is tight to gases and liquids.

The two ends of each hollow cylinder constituting an outer wall of an annular discharge chamber are tapered outwardly and the two ends of each hollow cylinder constituting an inner wall of an annular discharge space are reduced in diameter. This measure is taken in order to keep the cross-sectional area of the discharge space proper sufficiently small and to gain enough room for the insertion of the electrodes and the inlet and outlet nozzles for the passage of starting material and reaction product, respectively.

In order to create the same operating conditions in all discharge chambers the differences between the outer and the inner diameters of the annular chambers in which the discharges take place are equal in all the discharge chambers.

The total number of the hollow cylinders of an apparatus is such that the outermost and the innermost annular chambers constitute spaces containing cooling media.

In order to fix the position of the hollow cylinders with respect to one another and to enable them to be provided with packings that are tight to gases and liquids, the surfaces of the end walls facing the discharge chambers and the chambers containing the cooling madia are fitted with annular grooves.

Each discharge chamber is equipped with a plurality of electrodes which are inserted in the end wall at such distances from one another that the arcs between each electrode and its neighboring electrode are of equal length. These arcs are equal in all discharge chambers of one and the same apparatus.

The electrodes are inserted in heat insulating jackets so as to be shiftable in an axial direction. The said jackets are made of an electrically non-conducting material that is unaffected by temperature changes. The jackets are in their turn supported by stoppers which are fitted in the corresponding bore-hole of the end wall which they fill up so as to be tight to gases.

The emitting surfaces of the electrode are limited by said heat-insulating jackets, the limitation being adjustable.

In another form of the apparatus embodying the invention the electrodes are provided with an insulating coating of a high dielectric constant, which is unaffected by temperature changes.

In order to avoid a thermal overload the electrodes are provided with thermo-bimetallic switches.

In the end wall closing the hollow chambers at the side at which the starting material enters, inlet nozzles are inserted which are connected with a common distributor tube through which the reaction mixture or the starting material is supplied and through which said material is tangentially blown into the individual discharge chambers.

In the end wall closing the hollow chambers at the side at which the reaction or splitting product issues outlet nozzles through which said reaction or splitting product is tangentially sucked off and which are connected with the common collecting vessel for the reaction or splitting product are inserted.

Those ends of the delivery nozzles through which the reaction or splitting product enters them and which are situated in the discharge chambers are either cut off in tapering manner with respect to the longitudinal axis of the aforesaid nozzles or they are provided at their side with an orifice through which the material enters them.

In special cases an electroluminescent phosphorus is applied to the layer of enamel or artificial material of those sides of the hollow cylinders which form the boundary of the discharge chambers.

Other objects and advantages of the invention will become apparent from a study of the following description and drawings wherein.

Figure 3:
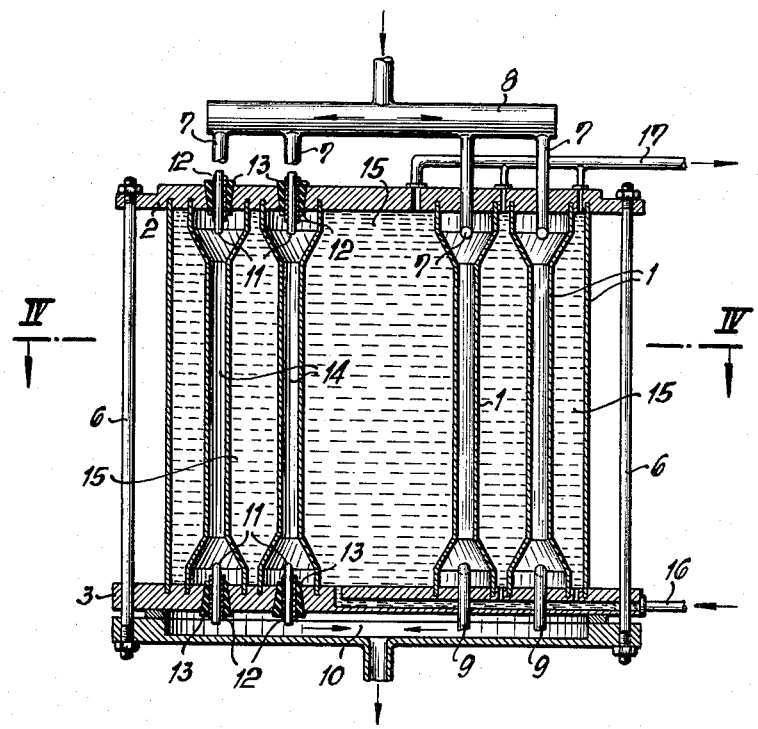
Figure 4:
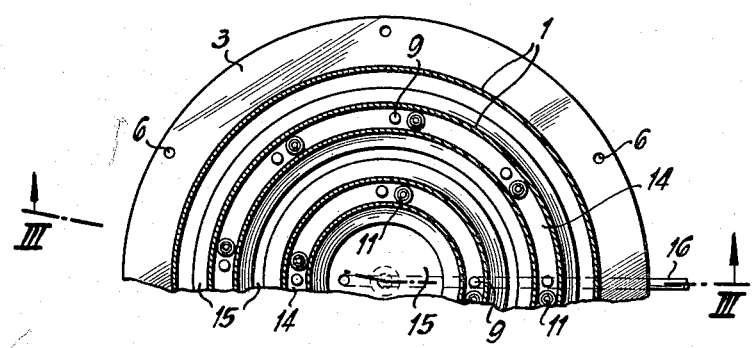

FIG. 3 is a longitudinal section of an apparatus comprising two discharge spaces and three spaces containing a cooling or heating medium taken along line III—III of FIG. 4, FIG. 4 is a section of such an apparatus taken along line IV—IV of FIG. 3, and FIGS. 5 to 7 represent the electrodes and nozzles of the apparatus on an enlarged scale with FIG. 5 taken along line V—V of FIG. 7 and FIG. 7 taken along line VII—VII of FIG. 6.

Referring to the drawings, hollow cylinders 1 forming concentric chambers are arranged between end walls 2 and 3 which are centered by means of annular grooves 4 in the end walls and which form an annular electrical discharge chamber 14 and two chambers 15 into which the cooling or heating medium is to be introduced. The device is held together by means of tractor screws 6. Nozzles 7 through which the starting material is introduced and electrodes 11 are disposed in the end wall 2, and nozzles 9 through which the reaction or splitting product issues and electrodes 11 are mounted in the end wall 3, in such a manner that they project into discharge chamber 14. Via pipes 16 and 17 the cooling or heating medium is introduced and discharged respectively. Via nozzles 7 the reaction mixture or starting material is introduced into discharge chamber 14 and via nozzles 9 the reaction or splitting product leaves the discharge chamber.

The apparatus represented diagrammatically in FIG. 3 comprises two electrical discharge chambers 14 and three chambers 15 into which a cooling or heating medium is to be introduced. FIG. 4 is a cross section of such an apparatus. The numeral 8 represents a distributor tube which enables the reaction mixture or the starting material to be supplied uniformly to nozzles 7.

The numeral 10 represents a vessel collecting the reaction or splitting product issuing through all nozzles 9.

FIGS. 5 to 7 represent the nozzles through which the starting material is introduced, the nozzles through which the reaction or splitting product issues and the electrodes on a enlarged scale.

Nozzle 7 which is provided at its side with an opening through which the starting material issues is inserted into end wall 2 in such a manner that the direction in which said starting material issues is coincident with the direction of the arrow shown in the drawing and tangential to the hole circle according to which the nozzles 7 are arranged and conducts the material past the electrode which is positioned on the same hole circle. Due to the action of the tangential component of speed imparted to the material and to the fall of pressure, the gas now flows in a helical line towards nozzles 9. Nozzles 9 are likewise positioned on the same hole circle as electrodes 11 but, seen in the direction of flow of the gas, each of them is arranged before the corresponding electrode, so that the electrodes are so to speak in the lee of the nozzles through which the reaction or splitting product issues.

Nozzles 9 are either provided with a lateral opening through which the issuing reaction or splitting product enters them and which is arranged at that side of the nozzles which faces the arriving current of gas or, as is shown in FIG. 5, the end of the nozzle 9 at which the issuing reaction or splitting product enters is cut off to form a tapering end.

Electrodes 11 are inserted in jackets 12 which consist of a non-conducting material which is not affected by temperature changes. The electrodes may be axially shifted in the jackets.

Jackets 12 are inserted in elastic stoppers 13 made, for example, of rubber and fitted in corresponding boreholes of walls 2 and 3. The device in which several cylinders are concentrically put one into the other enables a favorable utilization of the space and consequently optimum yields per volume (kilograms per unit of volume) to be obtained and owing to the common stabilization of the electrodes the electrical installations of the apparatus may be simple.

Figure 1:
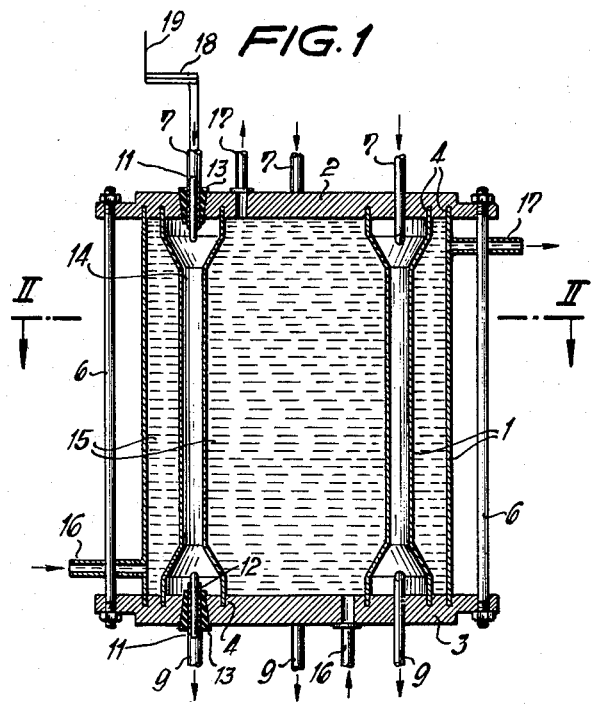
FIG. 1 is a section of an apparatus taken along line I—I of FIG. 2.
Figure 2:
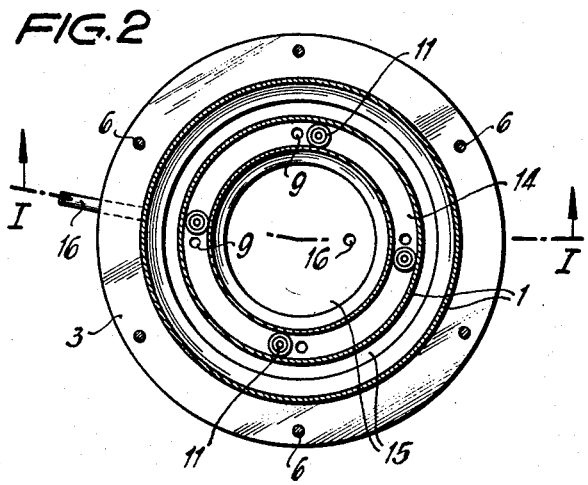
FIG. 2 is a section taken along line II—II of FIG. 1.

As shown in FIGS. 1 and 5 electrodes 11 are connected to thermo-bimetallic switches 18 which transmit the electrical power through conductor 19.

Nozzle, electrode and a certain sector of the annular space having the form of an arc, which is determined by the circular measure, constitute a so-called fundamental unit which corresponds to the passage of a certain quantity of starting material (liters per hour) supplied at a certain input of electrical energy (kilowatt) and a certain size (cm.$^2$) of the surfaces available for the dissipation or supply of heat.

If such a device is to be enlarged it suffices to provide it with additional annular chambers and the necessary armatures, that is to say with further fundamental units. Owing to this principle of assembling prefabricated parts essential modifications of the apparatus can be dispensed with and, besides, the thermal and electrical stability of the system are increased.

When the concentration of energy per unit of volume is sufficiently small and when the pressure is low no individual discharge paths are formed between the individual electrodes which are coordinated, but the whole of the discharge chamber available is uniformly filled with plasma. This phenomenon is favored by the uniform emission of the electrodes which can be regulated by a limiting emitting surface of the electrodes. Moreover, when the reaction mixture or the starting material leaves the inlet nozzles at a sufficiently high speed the jet of gas undergoes periodic variations of pressure of high frequency and the conditions of flow, pulsation and electrical charges of the surfaces undergo disturbances which also have a favorable influence on the regular distribution of the plasma. Hence, there results a good yield of energy (grams per kilowatt per hour) since in this method the danger of a decomposition of the substances once they have been formed is insignificant.

Another improvement in this respect is brought about by the very efficacious cooling or heating of the discharge chambers.

These two measures, viz. the adjustment of a low concentration of energy per unit of volume, the total volume of the discharge chambers being large, and the efficacious cooling or heating of the discharge chambers, together with the apparatus according to the invention enable chemical reactions in the glow discharge to be carried out continuously on an industrial scale with good yields per unit of volume and time (grams per hour and per volume).

As example of known reactions which can advantageously be carried out in the glow discharge there may be mentioned the manufacture of hydrocyanic acid from hydrocarbons and nitrogen or ammonia, the formation of nitric oxides from air, the preparation of ozone from oxygen and the preparation of anhydrous hydrazine from ammonia.

The following example serves to illustrate the invention but it is not intended to limit it thereto.

The values given in the following table relate to the preparation of hydrazine from ammonia.

| Device | Reaction volume (cc.) | Electrical yield (g./kilowatt-hour) | Yield per unit of volume and time (grams per 60 cc. per hour) |
|---|---|---|---|
| Single glass tube having a length of 800 mm. and a diameter of 10 mm., the walls being not coated with a catalytic material | 60 | 3 | 0.14 |
| The same tube, the walls being, however, coated with catalytic material | 60 | 10 | 0.32 |
| 7 tubes of the type described above, arranged in parallel, the walls being coated with catalytic material | 420 | 10 | 2.1 |
| Annular space, the walls being not coated with catalytic material | 60 | 10 | 2.6 |
| Annular space, the walls being coated with catalytic material | 60 | 10 | 3.0 |

We claim:

1. Apparatus for continuously carrying out chemical reactions by an electrical discharge comprising a plurality of elongated, concentrically arranged, spaced-apart and open-ended hollow cylinders placed one within the other and forming concentric chambers therebetween, a first and second end wall sealing off the open ends of said cylinders, electrodes extending through said first end wall into one of said concentric chambers formed by said concentric hollow cylinders which comprises an electrode chamber, inlets extending through said first end wall and into said electrode chamber for introducing gaseous or vaporous reactants into said electrode chamber, electrodes extending through said second end wall and into said electrode chamber, outlets extending through said second end wall and into said electrode chamber for discharging the reaction products of said gaseous or vaporous reactants from said chamber, inlets extending into each of the remaining chambers for introducing a temperature controlling medium into said chambers, outlets from each of said remaining chambers for discharging the temperature controlling medium, and means for supplying electrical power to said electrodes.

2. The apparatus of claim 1 in which each of the electrode chambers is provided with a plurality of electrodes which are inserted in the end walls at equal arc distances, said arc distances being the same in all discharge chambers.

3. The apparatus of claim 2 in which a plurality of electrodes connected in parallel are provided with a common stabilization resistance.

4. The apparatus of claim 1 in which the electrodes are fitted in heat-insulating jackets of a non-conducting material that is unaffected by temperature changes, the electrodes being shiftable in an axial direction and the heat-insulating jackets being in their turn inserted in a stopper that is fitted into the corresponding bore-hole of the end wall so as to be tight to gas.

5. The apparatus of claim 4 in which the emitting surfaces of the electrodes are limited by the heat-insulating jackets, the limitation being such that it can be regulated.

6. The apparatus of claim 4 in which the electrodes are coated with an electrically insulating material that is not affected by temperature changes and has a high dielectric constant.

7. The apparatus of claim 4 in which the electrodes are provided with thermo-bimetallic switches.

8. The apparatus of claim 1 in which the second end wall is provided with outlet nozzles which project from the electrode chambers in a direction parallel to the common axis of the chambers and which are connected with a common collecting vessel for the reaction product.

9. The apparatus of claim 8 in which the ends of the outlet nozzles at which the reaction product enters them are cut off in tapered manner with respect to their longitudinal axis.

10. The apparatus of claim 8 in which the ends of the outlet nozzles at which the reaction product enters are provided with a lateral inlet opening.

11. The apparatus of claim 1 wherein more than one electrode chamber is provided.

12. The apparatus of claim 1 wherein the interior surfaces of the electrode chambers are provided with an insulating coating and said end walls are formed of electrically insulating material.

13. The apparatus of claim 1 in which the ends of the electrode chamber are tapered outwardly.

14. The apparatus of claim 1 in which the differences between the outer and the inner diameters of the electrode chambers are equal.

15. The apparatus of claim 1 in which the end walls have annular grooves which serve to fix the position of the chambers to be fitted with packings so as to be tight to gases and liquids.

16. The apparatus of claim 1 in which the first end wall is provided with inlet nozzles which are mounted tangentially with respect to the curvatures of the electrode chambers and which are connected with a common distributor tube for the reaction mixture.

17. The apparatus of claim 1 in which an electro-luminescent phosphorus is applied to the inner surfaces of the electrode chambers.

References Cited by the Examiner

UNITED STATES PATENTS

| 1,050,260 | 1/13 | Walden | 204—322 |
| 1,708,126 | 4/29 | Esmarch | 204—312 |
| 2,022,650 | 12/35 | Dawsey | 204—312 |
| 2,676,145 | 4/54 | Weisz | 204—312 |
| 2,724,692 | 11/55 | Akerlof | 204—312 |
| 2,728,723 | 12/55 | Akerlof | 204—312 |

FOREIGN PATENTS 44,875  2/28  Norway.

WINSTON A. DOUGLAS, *Primary Examiner.*

JOHN R. SPECK, JOHN H. MACK, *Examiners.*